（12）United States Patent
Marsolek et al.

(10) Patent No.: US 10,458,076 B2
(45) Date of Patent: Oct. 29, 2019

(54) CONTROL SYSTEM FOR A ROAD PAVER

(71) Applicant: Caterpillar Paving Products Inc., Brooklyn Park, MN (US)

(72) Inventors: John Lee Marsolek, Watertown, MN (US); Toby Frelich, Saint Michael, MN (US); Kent Hoisington, Mound, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/657,645

(22) Filed: Jul. 24, 2017

(65) Prior Publication Data
US 2018/0030672 A1 Feb. 1, 2018

(30) Foreign Application Priority Data
Jul. 26, 2016 (EP) .................................... 16181264

(51) Int. Cl.
| *E01C 19/00* | (2006.01) |
| *E01C 19/42* | (2006.01) |
| *E01C 19/48* | (2006.01) |
| *G05D 1/02* | (2006.01) |
| *E01C 23/07* | (2006.01) |

(52) U.S. Cl.
CPC .......... *E01C 19/008* (2013.01); *E01C 19/004* (2013.01); *E01C 19/42* (2013.01); *E01C 19/4873* (2013.01); *E01C 23/07* (2013.01); *G05D 1/0246* (2013.01); *E01C 2301/14* (2013.01); *E01C 2301/16* (2013.01); *E01C 2301/20* (2013.01)

(58) Field of Classification Search
CPC .......... E01C 19/48; E01C 19/05; E01C 19/26; H04N 5/232; H04N 7/18; G05D 1/0246
USPC ....... 404/84.05, 101, 105, 111, 118; 700/299, 700/300
See application file for complete search history.

(56) References Cited

U.S. PATENT DOCUMENTS

| 5,356,238 | A | * | 10/1994 | Musil .................... E01C 19/008 404/101 |
| 5,362,176 | A | | 11/1994 | Sovik |
| 5,452,966 | A | | 9/1995 | Swisher, Jr. |
| 5,484,227 | A | * | 1/1996 | Ikeda .................... E01C 19/006 404/118 |
| 5,568,992 | A | | 10/1996 | Grembowicz et al. |
| 8,353,642 | B2 | | 1/2013 | Munz et al. |
| 8,641,321 | B2 | | 2/2014 | Eul et al. |

(Continued)

FOREIGN PATENT DOCUMENTS

EP 2990532 3/2016

*Primary Examiner* — Raymond W Addie
(74) *Attorney, Agent, or Firm* — Bookoff McAndrews

(57) ABSTRACT

A control system for a road paver comprises a camera system configured to generate image data of an environment of the road paver. The control system further comprises a controller electronically connected to the camera system. The controller is configured to receive the image data from the camera system, and to apply an object recognition process on the received image data to identify an edge line serving as a reference line for a mat to be laid by the road paver, and to determine a three dimensional position of the identified edge line. The controller may automatically control the road paver, and may assist an operator to control the road paver based on the identified position of the edge line.

18 Claims, 4 Drawing Sheets

(56) References Cited

U.S. PATENT DOCUMENTS

| | | |
|---|---|---|
| 9,045,871 B2 | 6/2015 | Graham et al. |
| 9,255,364 B2 | 2/2016 | Ichikawa |
| 2007/0285537 A1* | 12/2007 | Dwinell ................. G06T 7/001 348/263 |
| 2014/0363230 A1 | 12/2014 | Buschmann et al. |
| 2015/0199576 A1 | 7/2015 | Ichikawa |
| 2016/0060820 A1* | 3/2016 | Berning ................ E01C 19/004 404/75 |
| 2016/0177517 A1* | 6/2016 | Engels ...................... G06T 7/20 404/75 |
| 2016/0261848 A1* | 9/2016 | Sekiguchi ................ B60R 1/00 |
| 2017/0118925 A1* | 5/2017 | Noguchi ................ A01G 22/00 |
| 2017/0140227 A1* | 5/2017 | Takemura ................ G08G 1/16 |

* cited by examiner

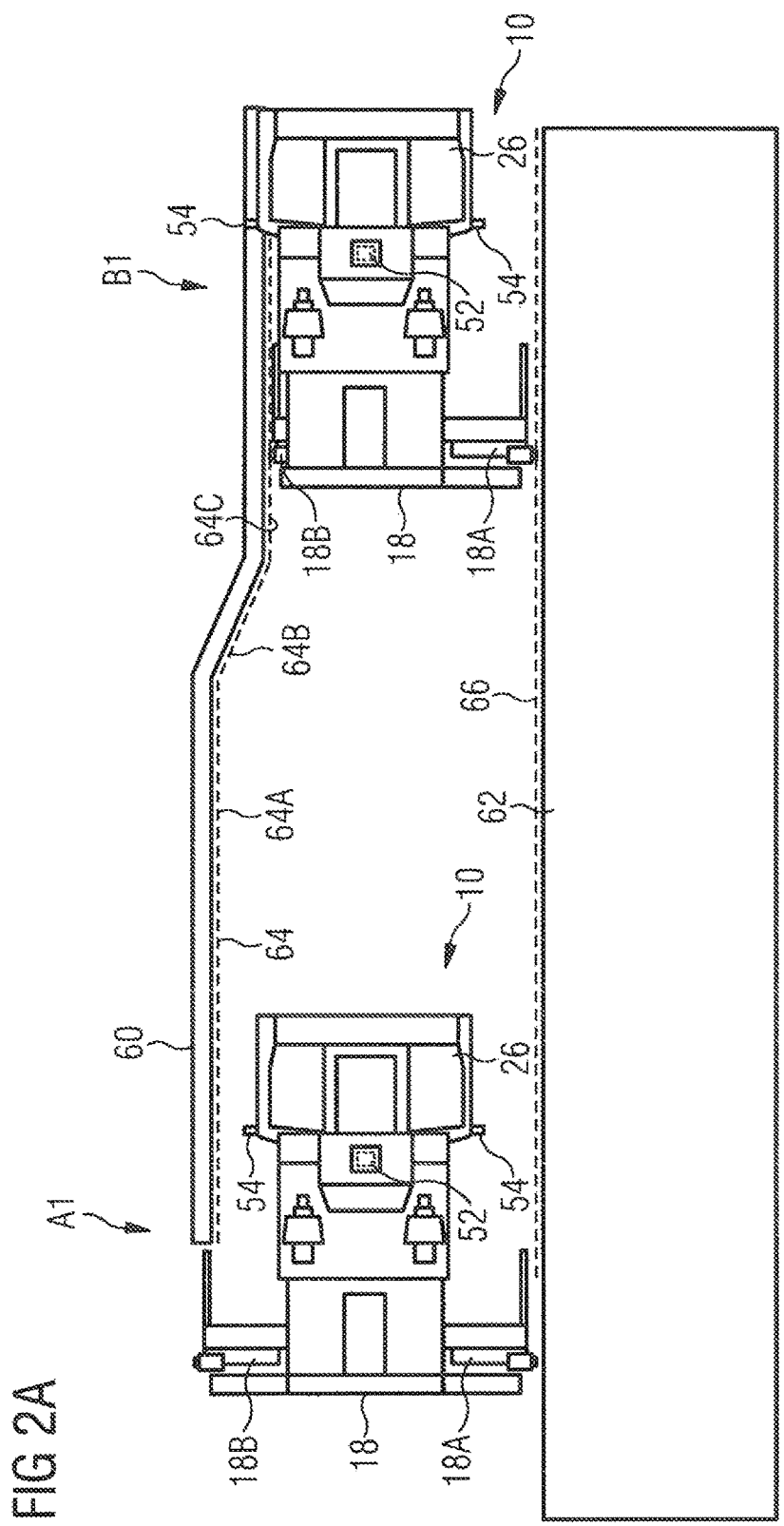

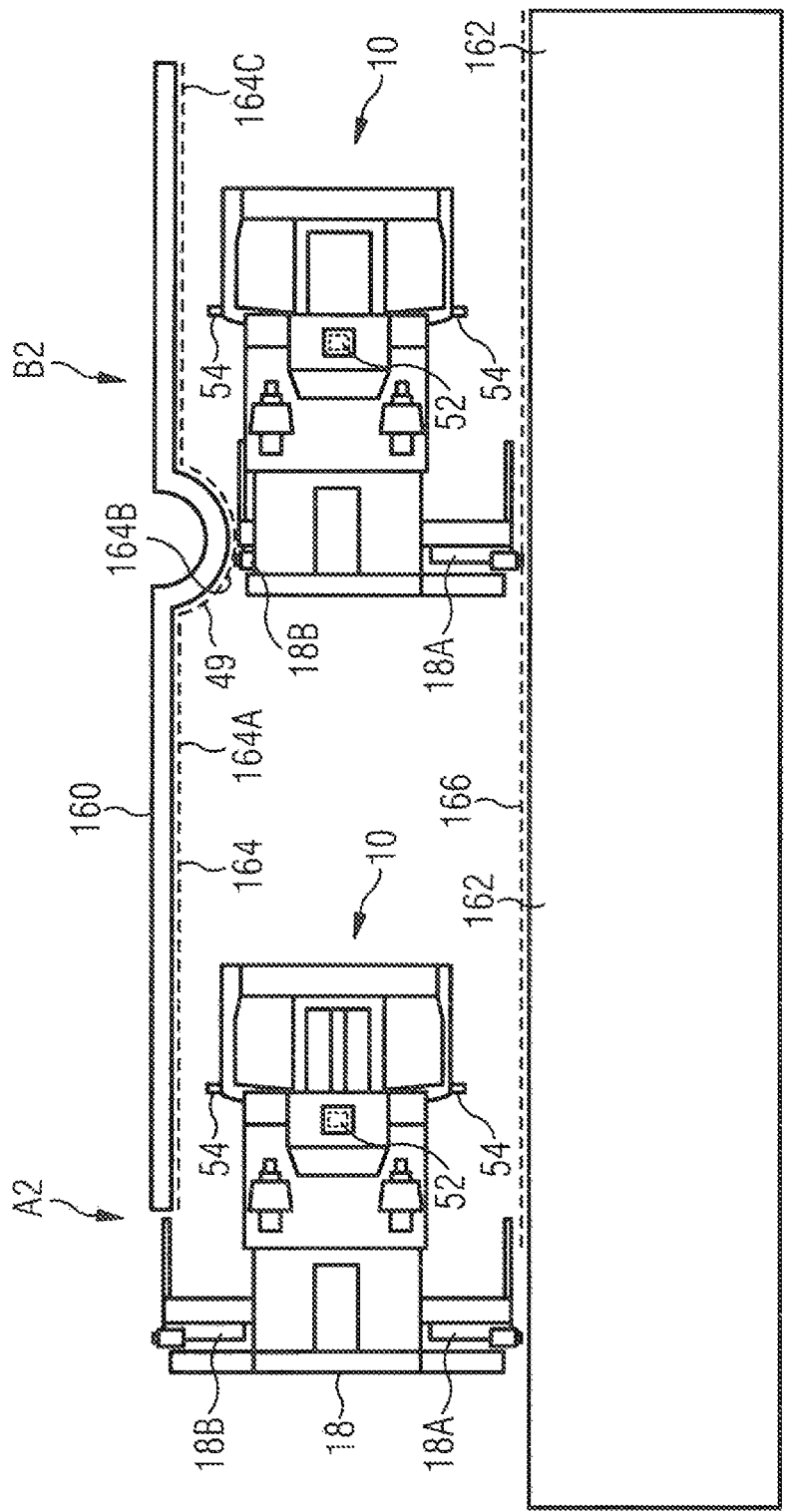

CONTROL SYSTEM FOR A ROAD PAVER

TECHNICAL FIELD

The present disclosure generally relates to a road paver. More particularly, the present disclosure relates to a control system for a road paver.

BACKGROUND

Paving machines (also referred to as road pavers and asphalt finishers) are commonly used to apply, spread and compact a paving, i.e., a mat of material, relatively evenly over a work surface. These machines are generally used in the construction of roads, parking lots and other areas. An asphalt paving machine generally includes a hopper for receiving asphalt material from a truck, a conveyor system for transferring the asphalt rearwardly from the hopper for discharge onto a roadbed, and a set of augers to evenly spread the paving material in front of the screed. A screed plate smoothes and compacts the asphalt material, ideally leaving behind a mat of uniform depth, density, texture and smoothness.

For example, a control device for a road paver is disclosed in U.S. Pat. No. 5,484,227 A. The control device automatically regulates the extension or retraction of the screeds on both sides of the road paver in reference to a visual display of a reference line following some objects along the roadside. In one embodiment, a laser emitter emits a slit-shaped laser beam which irradiates a reference line consisting of fixed objects along the roadside of the paving road. A camera records an illuminated line generated by irradiating the fixed objects along the reference line and displays a corresponding image on a screen of a display device.

The present disclosure is directed, at least in part, to improving or overcoming one or more aspects of prior systems.

SUMMARY OF THE DISCLOSURE

In another aspect, the present disclosure relates to a control system for a road paver. The control system comprises a camera system configured to generate image data of an environment of the road paver, and a controller electronically connected to the camera system. The controller is configured to receive the image data from the camera system. The controller is further configured to apply an object recognition process on the received image data to identify an edge line serving as a reference line for a mat to be laid by the road paver, and to determine a three dimensional position of the identified edge line.

In another aspect, the present disclosure relates to a road paver comprising a tractor and a screed assembly towed by the tractor. The road paver further includes a control system as exemplarily disclosed herein.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIGS. 2A to 2C shows a top view of an exemplary operation mode of the road paver of FIG. 1 moving from a position Ax to a position Bx.

DETAILED DESCRIPTION

Figure 1:
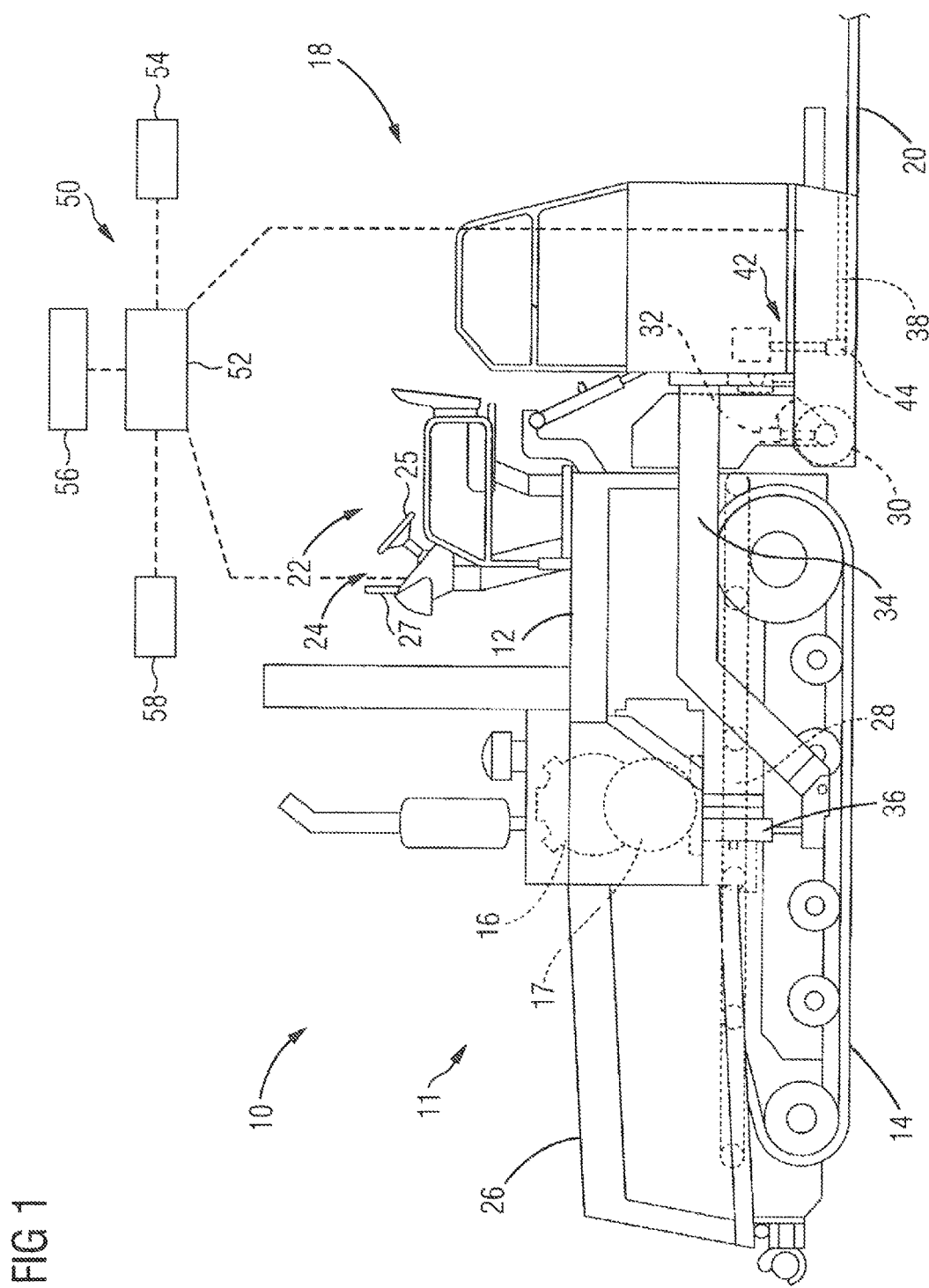
FIG. 1 is a diagrammatic side view of a paving machine towing a screed according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that an object detection process can be used to generate outputs that aid in operating a road paver. A camera system may be provided to generate image data of an environment surrounding the road paver. The object detection process can be applied to the image data to identify an edge line (or two edge lines), and a position thereof with respect to the road paver. The edge line serves as a reference for a mat to be laid by the road paver. This information can be used to either guide an operator to control the road paver to follow the identified edge line, or to automatically control the road paver to follow the identified edge line.

The present disclosure is further based in part on the realization that the object detection process can be also used to identify obstacles in the way of the road paver. Again, information on the identified obstacle can be used to either guide an operator to avoid the identified obstacle, or to automatically control the road paver to avoid the identified obstacle.

Referring to FIG. 1, a road paver (asphalt finisher) 10 includes a tractor 11 towing a floating screed assembly 18. The tractor 11 includes a frame 12 with a set of ground-engaging elements 14 such as wheels or tracks coupled with the frame 12. The ground-engaging elements 14 may be driven by an engine 16 in a conventional manner. The engine 16 may further drive an associated generator 17 that can be used to power various systems on the paving machine 10 and the screed assembly 18.

The screed assembly 18 is attached at the rear end of the tractor 11 to spread and compact paving material into a mat 20 having a desired shape, thickness, texture, width, density and smoothness. The road paver 10 also includes an operator station 22 having a seat and an operator interface 24, which includes various controls for directing operations of the paving machine.

The operator interface 24 includes a plurality of control and indication elements for the operator to allow monitoring and controlling operation of the road paver 10. For example, the operator interface 24 may include a steering wheel for steering the road paver 10. The interface 24 may include a display device 27 for outputting information to the operator.

The paving machine 10 further includes a hopper 26 for storing paving material, and a conveyor system including one or more conveyors 28 configured to move paving material from the hopper 26 to the screed assembly 18 at the rear of the paving machine 10.

One or more augers 30 are arranged near the forward end of the screed assembly 18 to receive the paving material supplied by the conveyor 28 and spread the material evenly in front of the screed assembly 18. The height of the augers 30 is adjustable via one or more height adjustment actuators 32, for example, hydraulic cylinders.

The screed assembly 18 may be pivotally connected behind the tractor 11 by a pair of tow arms 34 (only one of which is shown in FIG. 1) that extend between the frame 12 of the tractor 11 and the screed assembly 18. The tow arms 34 are pivotally connected to the frame 12 such that the relative position and orientation of the screed assembly 18 relative to the frame 12 and to the surface being paved may be adjusted by raising or lowering the tow arm actuators 36, for example, in order to control the thickness of the paving material deposited by the road paver 10. To this end, tow arm actuators 36 are provided that are arranged and configured to raise and lower the tow arms 34 and thereby raise and lower the screed assembly 18. The tow arm actuators 36 may be any suitable actuators, for example, hydraulic cylinders.

The screed assembly 18 may have any of a number of configurations known in the art. For example, it may be a single or multiple section screed. In some embodiments, the screed assembly 18 may include a screed extension provided adjacent to each of the left and right main screed sections. The screed extensions may be slideably movable laterally between retracted and extended positions such that varying widths of paving material can be laid. The lateral movement of the extensions may be driven by respective screed width actuators such as hydraulic or electric actuators. It should be noted, however, that in other embodiments the screed extensions may be omitted.

The screed assembly 18 also includes a screed plate 38, and a tamper device 42 positioned forward of the screed plate 38. The tamper device 42 extends transversely to the direction of travel of the road paver 10. A tamper bar 44 of the tamper device 42 cyclically acts on the laying material with essentially vertical strokes and a selectable stroke length.

The road paver 10 further includes a control system 50 schematically indicated in FIG. 1. The control system 50 includes a controller 52. The controller 52 may be disposed on the road paver 10, and/or on a remote location such as a remote control center for the job site.

The controller 52 is electronically connected to the operator interface 24. In some embodiments, the controller 52 may be configured to steer the road paver 10, to receive and output data to the operator interface 24, for example the display device 27, and/or to accelerate and slow down the road paver 10. Further, the controller 52 may be configured to control extension and retraction of the screed assembly 18.

The controller 52 may embody a single microprocessor or multiple microprocessors that include a means for monitoring operator and sensor input, and responsively adjusting operational characteristics of the road paver 10 based on the input. For example, the controller 52 may include a memory, a secondary storage device, a clock, and a processor, such as a central processing unit or any other means for accomplishing a task consistent with the present disclosure. Numerous commercially available microprocessors can be configured to perform the functions of the controller 52.

It should be appreciated that the controller 52 could readily embody a general machine controller capable of controlling numerous other machine functions. Various other known circuits may be associated with the controller 52, including signal-conditioning circuitry, communication circuitry, and other appropriate circuitry. The controller 52 may be further communicatively coupled with an external computer system, instead of or in addition to including a computer system, as desired.

The control system 50 further includes a camera system 54 configured to generate image data of an environment of the road paver 10. The camera system 54 is able to generate image data suitable for an object recognition process. The camera system 54 is electronically connected to the controller 52 for outputting generated image data of the environment of the road paver 10. The camera system 54 may include one or more cameras. In some embodiments, the camera system 54 may include one or more stereo cameras. The camera(s) of the camera system 54 may be stationary or movable.

The camera system 54 may be mounted on the road paver 10, and/or provided outboard of the road paver 10. For example, at least one camera of the camera system 54 may be mounted to a front portion, a middle portion, or a rear portion of the road paver 10 or the screed assembly 18. Additionally or alternatively, at least one camera of the camera system 54 may be provided at a mobile or stationary measuring station arranged at the job site, for example along a region to be paved.

In some embodiments, the camera system 54 may be provided decoupled from the screed assembly 18. For example, the camera system 54 may be mounted to the tractor 11, or may be provided outboard of the road paver 10. Decoupling the camera system 54 from the screed assembly 18 may ease an object recognition process applied on the image date generated by the camera system 54. Particularly, decoupling the camera system 54 from the screed assembly 18 may ease a three dimensional position determination of an identified edge line, because the position of the camera system 54 is fixed with respect to the tractor 11 or the job site, and not variable due to a changing width of the screed assembly 18.

The camera system 54 may be arranged to generate image data of a region in front of the road paver 10, to the sides of the road paver 10, and/or behind the road paver 10. Particularly, the camera system 54 may be arranged to generate image data of a region in front of the screed assembly 18, to the sides of the screed assembly 18, and/or behind the screed assembly 18. As used herein, the term "in front of" or "forward of" refers to a direction along a longitudinal axis of the road paver 10 from a rear end of the road paver 10 to a front end of the road paver 10.

The image data generated by the camera system 54 is received by the controller 52. The controller 52 performs an object recognition process (also called object detection process, or form and positive recognition process) of the received image data to identify at least an edge line serving as a reference (line) for a mat to be laid by the road paver 10. Particularly, the object recognition process of the received image data further determines a three dimensional position (expressed in Cartesian coordinates, cylindrical coordinates, or spherical coordinates, etc.) and/or orientation of the identified edge line. As described in detail below, the edge line may be used as a reference by the controller 52 to automatically control the road paver 10 or to guide the operator during operation. For performing the object recognition process, the controller 52 may include an image processor.

The object recognition process is set to identify an edge of an existing pavement structure such as a curb, an edge of a trench, an edge of an existing paved mat, and/or an edge of a reference beam or wire as the edge line. Additionally, the object recognition process may be set to identify a straight line, a curved line, a square line, and/or combinations thereof as the edge line.

The object detection process may optionally include a pre-processing of the received image data to reduce image interferences. For example, the image data may be equalized (distortions may be removed), image noise may be suppressed, and/or image softness or blur may be corrected.

As one skilled in the art will appreciate, the controller 52 may use one or more of a plurality of object recognition process techniques for identifying the edge line or other objects (such as obstacles), including, but not limited to, edge detection, corner detection, color detection, reflectance detection, segmentation, scaling, rotating, mirroring, and template (pattern) matching.

Based on the identified edge line, the controller 52 further applies the object recognition process to determine a three dimensional position of the identified edge line with respect to a reference point on the road paver 10 and/or the job site. This may include determining a parameter correlated with a distance between the camera system 54 and the position of the identified edge line. Additionally, an orientation of the identified edge line with respect to a fixed reference on the road paver 10 and/or the job site may be determined by applying the object recognition process. Additionally, a dimension, particularly a length, of the identified edge line may be determined by applying the object recognition process. Furthermore, the object recognition process may detect further relevant information necessary or desirable for operating the road paver 10 to pave along the identified edge line.

Based on the determined three dimensional position, orientation, and/or dimension of the identified edge line, the controller 52 may automatically operate the road paver 10 to pave along the edge line. The controller 52 may automatically operate the road paver 10 upon a corresponding command from the operator input via the operator interface 24. For example, the controller 52 may automatically steer, accelerate, slow down the road paver 10, and automatically extend and retract the screed assembly 18 to pave along the identified edge line. Further, the controller 52 may automatically adapt further operating parameters of the road paver 10, for example conveyor 28 speed, auger 30 speed, tamper bar 44 frequency etc., based on the identified edge line, and its position etc.

Additionally or alternatively to the automated paver control, the controller 52 may provide information associated with the edge line (position, orientation, dimension, etc.) to the operator via the operator interface 24, for example the display device 27. For example, the controller 52 may be configured to output image data to the display device 27 in which the identified edge line is highlighted or rendered in a real time image as detected by the camera system 54. Additionally, further associated information may be determined by the controller 52 and displayed on the display device 27. The associated information may assist the operator to operate the road paver 10 such that the mat is properly laid in relation to the edge line. For example, a clearance between the road paver 10 and the identified edge line, a desired steering direction or path to follow the edge line, a desired screed extension width to follow the edge line, a desired travel speed, and/or other desired operating parameters of the road paver 10 (conveyor 28 speed, auger 30 speed, tamper bar 44 frequency etc.), may be determined by the controller 52 based on the identified edge line. The controller 52 may provide also or alternatively output to any kind of user output device of the operator interface 24 generating an audible and/or visible signal to the operator, such as by varying sounds (e.g., beeps, tones, etc.) and/or lights (e.g., flashes, bars, colors, etc.).

In some embodiments, the control system 50 may further include a screed width sensor 56 associated with the screed assembly 18 to detect a parameter associated with a width of the screed assembly 18. For example, the screed width sensor 56 may detect a width of a left extension screed, a width of a right extension screed, an overall width of the screed assembly 18, a position of an outer end of the left extension screed, and/or a position of an outer end of the right extension screed. A corresponding signal may be generated by the screed width sensor, and received by the controller 52 for further processing, for example to assist in (automatically or manually) operating the road paver to follow the identified edge line, and to (automatically or manually) steer or pave around a determined obstacle in the way of the road paver 10. The screed width sensor 56 is electronically connected to the controller 52, and may be mounted at a suitable position on the road paver 10, for example at the screed assembly 18.

In some embodiments, the control system 50 may further include a steering angle sensor 58 electronically connected to the controller 52 to provide a signal indicative of a steering angle of the road paver 10. Again, the controller 52 may use the signal from the steering angle sensor 58 for further processing, for example to assist in (automatically or manually) operating the road paver to follow an identified edge line, and to (automatically or manually) steer or pave around a determined obstacle in the way of the road paver 10.

In some embodiments, the controller 52 may be further configured to automatically coordinate steering of the road paver 10 simultaneously with adjusting a screed width of the screed assembly 18 based on the determined position of the identified edge line, or to assist the operator to manually do so. Such a coordinated control may be particularly suitable if the controller 52 identifies a first edge line to the left of the road paver 10, and a second edge line to the right of the road paver 10, and further determines that a distance between the first and second edge lines is not constant (the first and second edge lines are not parallel).

As noted above, in some embodiments, the controller 52 may be further configured to perform the object recognition process to identify obstacles in the way of the road paver 10, particularly the screed assembly 18. Such obstacles may be, for example, manholes, barriers, and human beings. In those embodiments, similar to the object recognition process of the edge line, the controller 52 may be further configured to automatically operate the road paver 10 based on the identified obstacle, for example paving around the obstacle in case of a manhole, if possible, or stopping or slowing down the road paver in case of a human being. The controller 52 may be also or alternatively configured to determine information on the identified obstacle (three dimensional position, dimension etc.) by applying the obstacle detection process. The determined information can be provided to the operator of the road paver 10 via the operator interface 24 enabling the operator to decide on a suitable action.

Figure 2C:
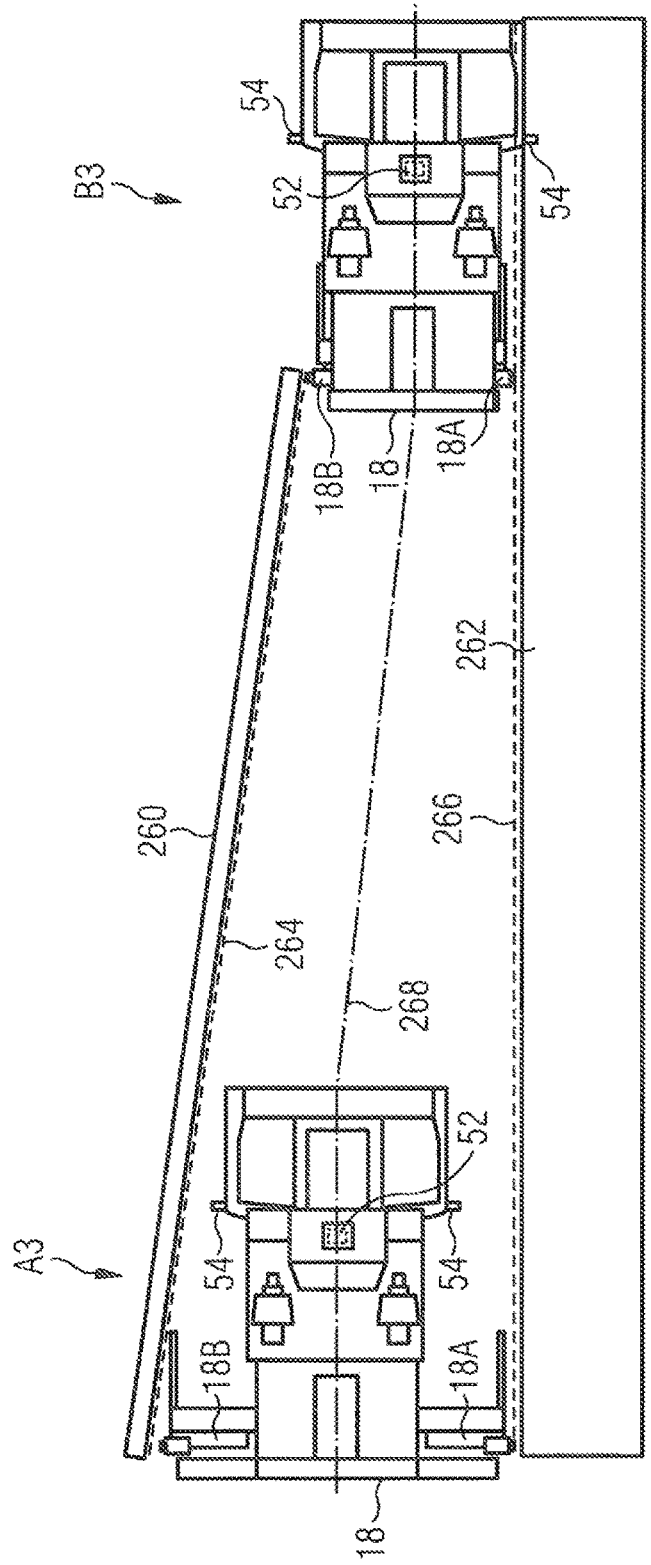

The object detection process for identifying an edge line as a reference for a mat to be laid by the road paver 10 can be used in a plurality of operation modes. Exemplary operation modes and exemplary configurations of the control system 50 are shown in FIGS. 2A to 2C, each of which showing a top view of the road paver 10 moving from a first position Ax to a second position Bx.

Referring to FIG. 2A, a top view of a first exemplary operation mode of the road paver 10 moving from a position A1 to a position B1 is shown.

The camera system 54 exemplary includes two cameras mounted on opposing sides of the road paver 10. The camera system 54 is arranged to generate image data of the regions to the left of the road paver 10, to the right of the road paver 10 and in front of the road paver 10.

The object detection process applied by the controller 52 on the received image data identifies a curb line 60, and an existing mat 62. Furthermore, a first edge line 64 of the curb line 60, and a second edge line 66 of the existing mat 62 are identified. The controller 52 further determines a position of the first and second edge lines 64 and 66 with respect to the road paver 10, and a route or profile of the edge lines 64 and 66 (including a length and orientation of the edge lines 64 and 66).

Based on the determined information, the road paver 10 can be automatically or manually controlled to lay a mat along the two edge lines 64 and 66 which serve as outer references or boundaries for the mat to be laid by the road paver 10.

In the shown example, it is determined that the second edge line 66 is a straight line, which results in a determination that a right screed section 18A can maintain its extended position. Furthermore, the controller 52 determines that the first edge line 64 includes a first straight section 64A, a narrowing section 64B, and a second straight section 64C. To pave along the first edge line 64, a left screed section 18B maintains its position during travel along the first straight section 64A, retracts during travel along the narrowing section 64B to follow the same, and maintains its position during travel along the second straight section 64C.

Referring to FIG. 2B, the object detection process applied on the image data received from the camera system 54 determines that an identified first edge line 164 of a curb line 160 includes a first straight section 164A, a second arcuate section 164B, and a third straight section 164C. For example, the arcuate section 164B may be present due to a manhole. Additionally, the object detection process determines that an identified second edge line 166 of an existing mat 162 is a straight line.

As the road paver 10 moves from position A2 to position B2, the right screed section 18A is controlled to maintain its position to follow the straight second edge line 166. Simultaneously, the left screed section 18B is controlled to maintain its position until it reaches the arcuate section 164B where the left screed section 18B is retracted and subsequently extended to follow the arcuate profile of the arcuate section 164B. During travel along the straight section 164C, the left screed section 18B maintains its position again.

Referring to FIG. 2C, the object detection process applied on the image data received from the camera system 54 determines that an identified first edge line 264 of a curb line 260 is a straight line, and an identified second edge line 266 of an existing mat 262 is a straight line too. The object detection process further determines that the identified first edge line 264 is non-parallel (inclined) with respect to the second edge line 266.

Based on the determined information on the first and second edge lines 264 and 266 (position, orientation, length, relationship etc.), the road paver 10 is moved from a position A3 to a position B3 in a coordinated fashion of retracting both screed sections 18A and 18B while simultaneously steering the road paver 10 to follow the first and second edge lines 264 and 266.

For example, the controller 52 may determine a road centerline 268. The road paver 10 is steered to follow the road centerline 268, and the right and left screed sections 18A and 18B are retracted to follow the right and left edge lines 264 and 266.

INDUSTRIAL APPLICABILITY

The control system as disclosed herein is applicable for automatically operating or assisting in manually operating a road paver. Particularly, the control system as disclosed herein is applicable for automatically operating or assisting in manually operating a road paver to follow at least one identified edge line.

Terms such as "about", "around", "approximately", or "substantially" as used herein when referring to a measurable value such as a parameter, an amount, a temporal duration, and the like, is meant to encompass variations of ±10% or less, preferably ±5% or less, more preferably ±1% or less, and still more preferably ±0.1% or less of and from the specified value, insofar as such variations are appropriate to perform in the disclosed invention. It is to be understood that the value to which the modifier "about" refers is itself also specifically, and preferably, disclosed. The recitation of numerical ranges by endpoints includes all numbers and fractions subsumed within the respective ranges, as well as the recited endpoints. Although the preferred embodiments of this invention have been described herein, improvements and modifications may be incorporated without departing from the scope of the following claims.

Although the preferred embodiments of this invention have been described herein, improvements and modifications may be incorporated without departing from the scope of the following claims.

The invention claimed is:

1. A control system for a road paver, the control system comprising:
   a camera system configured to generate image data of an environment of the road paver, and
   a controller electronically connected to the camera system, and configured to:
      receive the image data from the camera system; and
      apply an object recognition process on the received image data to:
         identify an edge line serving as a reference line for a mat to be laid by the road paver;
         determine a three dimensional position of the identified edge line;
         modify a paving width of the road paver to lay the mat bound by the reference line by automatically retracting or extending a screed assembly of the road paver based on the determined position of the identified edge line, and
         automatically steer the road paver based on the determined position of the identified edge line, wherein the controller is configured to simultaneously steer the road paver and modify the paving width,
   wherein the simultaneous steering of the road paver and modifying of the paver width includes adjusting a screed width of a screed assembly of the road paver simultaneously with the steering of the road paver based on the determined position of the identified edge line such that the road paver maintains a position centered between edges of the mat to be laid.

2. The control system of claim 1, wherein the controller is further configured to apply the object recognition process on the received image data to determine an orientation and dimension of the identified edge line.

3. The control system of claim 1, wherein the step of determining a three dimensional position of the identified edge line comprises determining a parameter correlated with a distance between the camera system and the identified edge line.

4. The control system of claim 1, wherein the controller is further configured to pre-process the image data received from the camera system to reduce image interferences in preparation for the object recognition process.

5. The control system of claim 1, wherein the edge line is detected by use of at least one of the object recognition process techniques from the group including edge detection, corner detection, color detection, reflectance detection, segmentation, scaling, rotating, mirroring, and template matching.

6. The control system of claim 1, wherein the object recognition process is configured to identify an edge of an existing pavement structure, a curb, an edge of a trench, an edge of an existing paved mat, or an edge of a reference beam or wire as the edge line.

7. The control system of claim 1, wherein the object recognition process is configured to identify a straight line, a curved line, a square line, or combinations thereof as the edge line.

8. The control system of claim 1, further comprising an operator interface electronically connected to the controller, wherein the controller is further configured to provide information associated with the edge line to the operator interface.

9. The control system of claim 1, wherein the controller is further configured to:
determine a desired path, a desired screed width, and a coordinated combination of the desired path and the desired screed width of the road paver based on the position of the identified edge line; and
provide a corresponding signal to an operator interface.

10. The control system of claim 1, wherein the controller is further configured to perform an object recognition process of the received image data to identify an obstacle in the way of the road paver.

11. The control system of claim 1, wherein identifying the edge line serving as the reference line for the mat to be laid by the road paver includes identifying a first edge and a second edge, and wherein, based on the object recognition process, the controller is configured to:
control the paving width and the steering direction of the road paver in order to follow the first edge and the second edge,
wherein, if the first edge and the second edge are non-parallel, the controller is configured to:
extend or retract both a right screed section and a left screed section in order to adjust the paving width; and
simultaneously identify a road center between the first edge and the second edge and steer the road paver to follow the road center.

12. A road paver, comprising:
a tractor;
a screed assembly towed by the tractor, wherein the screed assembly includes an adjustable width; and
a control system, wherein the control system includes:
a camera system configured to generate image data of an environment of the road paver, and
a controller electronically connected to the camera system, and configured to:
receive the image data from the camera system;
apply an object recognition process on the received image data to determine a three-dimensional position of an identified object;
modify a paving width of the road paver to avoid the identified object by adjusting the width of the screed assembly; and
simultaneously with the paving width modification, steer the road paver by adjusting a direction of the road paver,
wherein the simultaneous steering of the road paver and modifying of the paver width includes adjusting a screed width of a screed assembly of the road paver simultaneously with the steering of the road paver based on the determined position of the identified object such that the road paver maintains a position centered between edges of the mat to be laid.

13. The control system of claim 12, wherein, based on the object recognition process, the controller is configured to:
identify a first edge;
identify a second edge; and
control the paving width and the steering direction of the road paver in order to follow the first edge and the second edge,
wherein, if the first edge and the second edge are non-parallel, the controller is configured to:
extend or retract both a right screed section and a left screed section in order to adjust the paving width; and
simultaneously identify a road center between the first edge and the second edge and steer the road paver to follow the road center.

14. The road paver of claim 12, wherein the camera system is mounted to the tractor and decoupled from the screed assembly.

15. A control system for a road paver, the control system comprising:
a camera system configured to generate image data of an environment of the road paver, and
a controller electronically connected to the camera system, and configured to:
receive the image data from the camera system;
apply an object recognition process on the received image data to determine a three-dimensional position of an identified object and identify at least one edge line serving as a reference line for a mat to be laid by the road paver; and
simultaneously adjust a steering direction and modify a paving width of the road paver by automatically retracting or extending a screed assembly of the road paver based on the position of the identified edge line to follow the at least one edge line while the road paver lays a mat of paving material.

16. The control system of claim 15, wherein the controller is configured to simultaneously steer the road paver by adjusting the direction of the road paver and modify the paving width in order to maintain the road paver in a centered position relative to a width of the mat of paving material.

17. The control system of claim 15, wherein, based on the object recognition process, the controller is configured to:
identify a first edge;
identify a second edge; and
control the paving width and the steering direction of the road paver in order to follow the first edge and the second edge.

18. The control system of claim 17, wherein, if the first edge and the second edge are non-parallel, the controller is configured to:
   extend or retract both a right screed section and a left screed section in order to adjust the paving width; and
   simultaneously identify a road center between the first edge and the second edge and steer the road paver to follow the road center.

* * * * *